(12) United States Patent
Junge

(10) Patent No.: US 10,948,066 B2
(45) Date of Patent: Mar. 16, 2021

(54) SLIDING MODULE OF A CAMSHAFT

(71) Applicants: THYSSENKRUPP PRESTA TECCENTER AG, Eschen (LI); thyssenkrupp AG, Essen (DE)

(72) Inventor: Volker Junge, Wernigerode (DE)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/301,682

(22) PCT Filed: May 19, 2017

(86) PCT No.: PCT/EP2017/062133
§ 371 (c)(1),
(2) Date: Nov. 14, 2018

(87) PCT Pub. No.: WO2017/202723
PCT Pub. Date: Nov. 30, 2017

(65) Prior Publication Data
US 2019/0219145 A1   Jul. 18, 2019

(30) Foreign Application Priority Data

May 24, 2016 (DE) ...................... 10 2016 208 968.4

(51) Int. Cl.
*F16H 53/04* (2006.01)
*F01L 1/047* (2006.01)
(Continued)

(52) U.S. Cl.
CPC ............. *F16H 53/04* (2013.01); *F01L 1/047* (2013.01); *F16H 53/025* (2013.01);
(Continued)

(58) Field of Classification Search
CPC ............. F01L 1/047; F01L 2013/0052; F01L 2001/0473; F16H 53/025; F16H 53/04
See application file for complete search history.

(56) References Cited

U.S. PATENT DOCUMENTS 5,272,930 A * 12/1993 Nakamura ........... B21D 53/845
29/888.1
5,419,217 A *  5/1995 Umezawa ............ B21D 53/845
74/567

(Continued)

FOREIGN PATENT DOCUMENTS

DE          4306621 A    9/1994
DE     102006001769 A    7/2007
(Continued)

OTHER PUBLICATIONS

English Translation of International Search Report issued in PCT/EP2017/062133, dated Oct. 10, 2017.

*Primary Examiner* — Patrick Cicchino
(74) *Attorney, Agent, or Firm* — thyssenkrupp North America, LLC

(57) ABSTRACT

A sliding module having a sliding sleeve and at least one cam segment having at least one cam. The sliding sleeve has a positioning section for positioning the cam segment fixedly against rotation and displacement. The positioning section includes a surface structure on the outer circumferential face of the sliding sleeve for producing a press-fit connection between the cam segment and the sliding sleeve. A stop region is provided configured to limit an axial movement of the cam segment.

10 Claims, 4 Drawing Sheets

(51) Int. Cl.
  *F16H 53/02*  (2006.01)
  *F01L 13/00*  (2006.01)
(52) U.S. Cl.
  CPC ............... *F01L 2001/0473* (2013.01); *F01L 2013/0052* (2013.01); *F01L 2303/00* (2020.05)

(56) References Cited

U.S. PATENT DOCUMENTS

| | | | | |
|---|---|---|---|---|
| 7,721,432 B2 * | 5/2010 | Burgler | ................. | B23P 15/00 |
| | | | | 29/888.1 |
| 9,222,374 B2 * | 12/2015 | Menonna | .............. | B23P 11/025 |
| 9,261,177 B2 * | 2/2016 | Binder | .................. | F01L 1/34 |
| 9,757,822 B2 * | 9/2017 | Stappelmann | ........ | B23P 11/025 |
| 10,364,711 B1 * | 7/2019 | Riley | ................. | F01L 13/0005 |
| 2005/0045130 A1 * | 3/2005 | White | .................... | F01L 1/344 |
| | | | | 123/90.17 |
| 2008/0250895 A1 * | 10/2008 | Yamamoto | ............ | F16H 53/025 |
| | | | | 74/567 |
| 2010/0224147 A1 | 9/2010 | Clever | | |
| 2015/0114170 A1 * | 4/2015 | Gunnel | ................. | F16H 53/025 |
| | | | | 74/568 R |
| 2017/0157729 A1 * | 6/2017 | Muster | ..................... | F01L 1/34 |
| 2018/0283242 A1 * | 10/2018 | Hirschmann | ....... | F01L 13/0036 |
| 2019/0107010 A1 * | 4/2019 | Sung | ........................ | B21K 1/06 |

FOREIGN PATENT DOCUMENTS

| | | |
|---|---|---|
| DE | 212006000020 U | 11/2007 |
| DE | 102007017514 A | 10/2008 |
| DE | 102008005639 A | 7/2009 |
| DE | 102008036882 A | 2/2010 |
| DE | 102011001711 A | 10/2012 |
| DE | 102012025442 | 6/2014 |
| DE | 102014116195 A | 5/2016 |
| EP | 2981688 | 2/2016 |
| JP | S59155660 A | 9/1984 |
| KR | 20120018409 A | 3/2012 |

\* cited by examiner

SLIDING MODULE OF A CAMSHAFT

CROSS REFERENCE TO RELATED APPLICATIONS

This application is a U.S. National Stage Entry of International Patent Application Serial Number PCT/EP2017/062133, filed May 19, 2017, which claims priority to German Patent Application No. DE 10 2016 208 968.4, filed May 24, 2016, the entire contents of both of which are incorporated herein by reference.

FIELD

The present disclosure generally relates to a sliding module for making a movement of a camshaft segment possible in the axial direction along a shaft.

BACKGROUND

DE 10 2008 005 639 A1 has disclosed a valve train apparatus which has two cam elements which are arranged on a camshaft and have in each case two cam pairs for different cylinders. Each cam pair has in each case two cams of different configuration with an identical base circle radius, the cams being of different configuration in each case for different operating modes, such as a firing mode and an engine braking mode or a low rotational speed range and a high rotational speed range. The two cam elements are arranged on the camshaft such that they can be displaced in the axial direction. The camshaft and the two cam elements are connected fixedly to one another so as to rotate together by way of a multiple tooth connection. As is apparent from the figures, each cam element has a tubular main body with cam pairs which are configured correspondingly thereon and a switch guide plate which is configured thereon. The shaft body extends through the tubular main body, along which shaft body the cam elements are arranged such that they can be displaced in the axial direction. The axial movements of the cam elements are limited via stop means. It is shown clearly that a configuration of this type of a cam element requires an increased complexity in terms of manufacturing technology. In addition, a corresponding cam element is to be configured for each specific motorization and/or for each specific internal combustion engine, as a result of which the manufacturing complexity is increased considerably and the manufacturing costs are increased considerably.

Fundamentally, the configuration of cam elements on a sliding sleeve is known for eliminating said disadvantage, the cam elements being pressed onto the sliding sleeve to this end. The manufacture of a very wide variety of camshafts of a very wide variety of motorizations is possible by way of said modular design comprising cams which are produced individually and are to be mounted with one another on the sliding sleeve. Here, however, the problem of the cam which slips on the sliding sleeve in the axial direction during the operation of the camshaft is often manifested. This is due to the to and fro movement of the sliding sleeve and is caused by it coming into contact with any stop faces for limiting its axial movement. On account of the acceleration and deceleration of the sliding sleeve, the cam which is arranged on the sliding sleeve experiences a corresponding drive force and braking force in the axial direction and accordingly a force (axial force) which acts on the cam in the axial direction. The release of the cam from the sliding sleeve and therefore a movement of the cam relative to the sliding sleeve in the axial direction occur disadvantageously on account of said axial force. As a consequence, a correct functionality of the camshaft is no longer ensured.

Thus a need exists for a sliding module of modular construction for making an axial movement of a cam segment along a load-bearing shaft of a camshaft possible, which sliding module can be manufactured in a simple and inexpensive way and the individual components of which can be combined with one another in such a way that a multiplicity of different camshafts and/or sliding modules for a very wide variety of motorizations can be manufactured by way of a small number of individual components.

DETAILED DESCRIPTION

Figure 1:
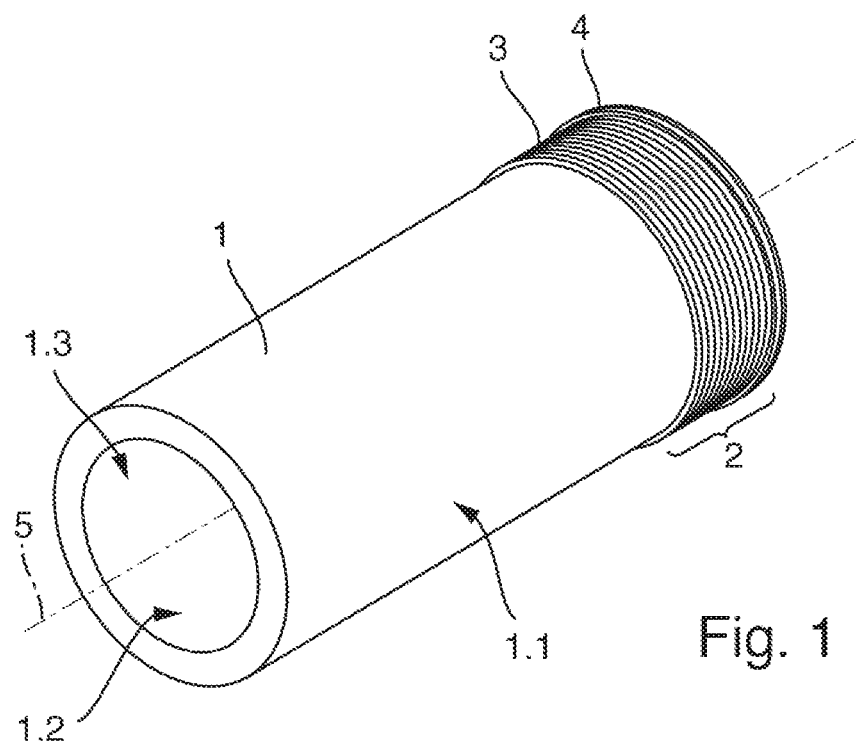
FIG. 1 is a perspective view of one embodiment of a sliding sleeve of a sliding module.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a sliding module for making a movement of a camshaft segment possible in the axial direction along a shaft, in particular a load-bearing shaft of a camshaft.

The sliding module according to the invention has a sliding sleeve and at least one cam segment. The cam segment has at least one cam, advantageously two or more cams with cam tracks which are different than one another for the variable setting and control of inlet valves or outlet valves of an internal combustion engine. The sliding sleeve of the sliding module has a positioning section for positioning the cam segment fixedly against rotation and displacement, the positioning section having a surface structure on the outer circumferential face of the sliding sleeve for producing a press-fit connection between the cam segment and the sliding sleeve. Furthermore, the positioning section comprises a stop region for limiting an axial movement of the cam segment. Accordingly, the sliding module itself advantageously serves to make an axial movement of the cam segment possible along a shaft, in particular a load-bearing shaft of a camshaft. In addition, the sliding module has a through opening, through which the load-bearing shaft extends. Accordingly, the sliding module and the load-bearing shaft are advantageously configured coaxially with respect to the longitudinal axis relative to one another. Furthermore, it is conceivable that the sliding module additionally has a sliding element with a guide groove of corresponding configuration, into which, for example, a pin of an actuator engages, in order to make the sliding movement of the sliding module in the axial direction along the load-bearing shaft possible. The stop region of the sliding sleeve of the sliding module advantageously serves to absorb the axial forces which are introduced onto the cam segment, in order to prevent a displacement of the cam segment along the sliding sleeve during the to and fro movement of the sliding module along the load-bearing shaft.

Furthermore, it is possible that the stop region is a constituent part of the surface structure. Accordingly, the stop region is a specifically shaped region of the sliding sleeve and differs at least in terms of its geometric configuration from the remaining surface structure of the positioning section of the sliding sleeve. The stop region is advantageously configured in such a way that axial forces which act on the cam segment are absorbed, in order to prevent an axial movement of the cam segment along the sliding sleeve.

Furthermore, it is possible that the surface structure is a material accumulation, in particular a roll-formed portion. It is thus possible that the surface structure is produced by means of a roll-forming method or reaming method. The surface structure advantageously produces an increase of the outer circumference of the sliding sleeve in the region of the positioning section, in order to make an effective press-fit connection between the sliding sleeve and the cam segment possible. The cam segment is advantageously arranged on the sliding sleeve in the region of the positioning section, as long as a sliding module is produced. During the attachment of the cam segment onto the sliding sleeve, in particular the positioning section of the sliding sleeve, a material accumulation takes place in the region of the positioning section, in particular in the region of the material accumulation, with the result that an effective press-fit connection is produced between the sliding sleeve and the cam segment.

Furthermore, it is conceivable within the context of the invention that the stop region is a projection which extends in the radial direction away from the outer circumferential face of the sliding sleeve. As a consequence, the stop region advantageously protrudes in the radial direction beyond the surface structure of the positioning section of the sliding sleeve. This means that, as viewed in the radial direction, the stop region advantageously has a greater extent than the surface structure of the positioning section. The stop region advantageously has a force absorbing surface which makes contact with the cam segment or a section of the cam segment in such a way that, in the case of an application of a force which acts on the cam segment in the axial direction, said force can be introduced into the stop region. Here, the stop region first serves advantageously to make the correct positioning of the cam segment on the sliding sleeve possible in the case of an application of the cam segment onto the sliding sleeve. Furthermore, the stop region serves to absorb and to correspondingly dissipate the axial forces which act on the cam segment, in order to avoid a displacement of the cam segment on the sliding sleeve in the axial direction. It is advantageously desired that the cam segment and the sliding sleeve are positioned fixedly with one another against rotation and displacement, with the result that no relative movement takes place between the sliding sleeve and the cam segment.

Furthermore, it is conceivable that the stop region is configured at a distal end of the sliding sleeve. As a consequence, in the case of an application of the cam segment onto the sliding sleeve, the stop region acts to limit the displacement movement of the cam segment in such a way that the cam segment terminates with the sleeve on one end side. The stop region advantageously has a deformation clearance. The deformation clearance of the stop region makes it possible that the stop region, in particular the material of the stop region, can be received within the deformation clearance in such a way that, in the case of an application or setting of the cam segment on the sliding sleeve, the stop region, in particular the material of the stop region, does not protrude or project beyond the end region of the sliding sleeve, in particular as viewed in the axial direction. Accordingly, the deformation clearance is advantageously a material cutout in the stop region, which deformation clearance serves for at least partially receiving material of the stop region during the pressing of the cam segment onto the sliding sleeve.

Furthermore, it is conceivable within the context of the invention that the stop region is configured at an end of the positioning section. Accordingly, it is likewise possible that the stop region is not configured at a distal end of the sliding sleeve, but rather as long as at least the positioning section is arranged offset with respect to the distal end of the sliding sleeve, the stop region also identifies merely the end of the positioning section and, as a consequence, is likewise of axially offset configuration with respect to the distal end of the sliding sleeve. This is advantageous, in particular, when, as viewed in the axial direction, the end regions of the sliding sleeve are to be present in non-machined form. In addition to the positioning region, the sliding sleeve has a remaining region which is advantageously of untreated configuration, that is to say without a surface structure. As viewed in the longitudinal direction, the stop region adjoins the surface structure and, with it, forms the positioning region. The remaining region is configured so as to adjoin the positioning region, in particular so as to adjoin the surface structure.

Furthermore, it is possible that the cam segment has a through bore with at least one insertion bevel which is configured at a distal end. The insertion bevel advantageously facilitates pushing of the cam segment onto the sliding sleeve, in particular onto the positioning section of the sliding sleeve. Furthermore, said insertion bevel advantageously aids the transition onto the stop region of the axial force which is introduced onto the cam segment. Furthermore, it is conceivable that the insertion bevel is of geometrically corresponding configuration with respect to the force absorbing surface. The insertion bevel of the cam segment advantageously interacts with the force absorbing surface of the stop region. Accordingly, it is conceivable that a region of the surface of the insertion bevel makes full-area contact with a region of the force absorbing surface.

Furthermore, it is conceivable that the cam segment has a through bore with a material accumulation, in particular a toothing system. Said toothing system is advantageously configured in the form of a longitudinal toothing system. In its through bore, the cam segment particularly advantageously has a toothing system which runs transversely with respect to a surface structure which is applied on the sliding sleeve, as long as the cam segment is set on the sliding sleeve. As a result, the press joint between the cam segment and the sliding sleeve is advantageously increased.

Furthermore, it is conceivable that the sliding sleeve has a through opening with an internal toothing system which extends at least in sections along the through opening. The internal toothing system is advantageously configured in the form of a longitudinal toothing system which extends along the longitudinal axis of the sliding sleeve. In the case of an application of the sliding sleeve onto, for example, a load-bearing shaft, the sliding sleeve advantageously has an internal toothing system which corresponds to the external toothing system of the load-bearing shaft, with the result that the internal toothing system of the sliding sleeve can be brought into engagement with the external toothing system of the load-bearing shaft, to be precise in such a way that the sliding sleeve is arranged such that it can be displaced along the load-bearing shaft in the axial direction but cannot be rotated. This means that the sliding sleeve can absorb torques which are introduced by way of the load-bearing shaft via the corresponding longitudinal toothing system, but at the same time can be displaced, at least in sections, along the load-bearing shaft in the axial direction.

In addition, a camshaft is claimed which has a load-bearing shaft with at least one longitudinal toothing system which is configured at least in sections on the load-bearing shaft and with a sliding module in accordance with the abovementioned type. The load-bearing shaft is advantageously configured in the form of a solid shaft. Said toothing system or longitudinal toothing system extends at least in sections on the outer circumference of the load-bearing shaft in the longitudinal direction and corresponds with the internal toothing system of the sliding sleeve in its through opening, in order to make a displacement of the sliding sleeve in the axial direction along the load-bearing shaft possible, but to prevent a rotation of the sliding sleeve in the circumferential direction about the load-bearing shaft. The camshaft advantageously has a plurality of abovementioned sliding modules.

Elements with the same function and method of operation are provided in each case with the same designations in FIGS. 1 to 7.

FIG. 1 shows a perspective view of one embodiment of a sliding sleeve 1 of a sliding module according to the invention. The sliding sleeve 1 has an outer circumferential face 1.1 and an inner circumferential face 1.2. The inner circumferential face 1.2 is formed by way of a through opening 1.3. The positioning section 2 having a surface structure 3 and a stop region 4 is configured on the outer circumferential face 1.1. Those having ordinary skill in the art will understand that in some examples the stop region 4 may also be referred to as a "stop." As viewed in the axial direction along the longitudinal axis 5, the positioning section 2 is configured at a distal end of the sliding sleeve 1. It is also conceivable, however, that the positioning section 2 is of indented configuration with respect to the distal end of the sliding sleeve 1 as viewed in the axial direction along the longitudinal axis 5, with the result that the distal end of the sliding sleeve 1 is present, for example, in an untreated form, that is to say without a configured surface structure 3 and without a configured stop region 4.

Figure 2:
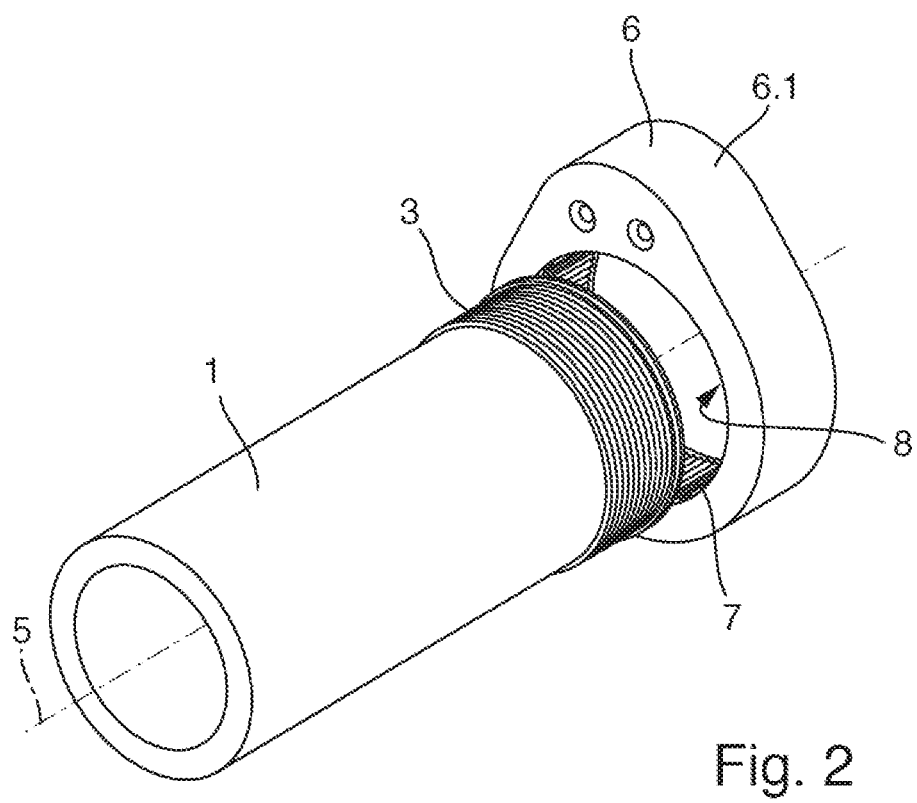
FIG. 2 is a perspective view of one embodiment of a disassembled sliding module.

FIG. 2 shows one embodiment of a sliding module 10 in the state in which it is not yet assembled, that is to say in the disassembled state. In terms of its configuration, the sliding sleeve 1 corresponds to the sliding sleeve which is shown in FIG. 1. In addition, the sliding module 10 has a cam segment 6 which, as shown in FIG. 2, consists of a cam 6.1. It is also conceivable, however, that the cam segment 6 comprises a plurality of cams, in particular two or more cams which can be arranged next to one another in the axial direction along the longitudinal axis 5 on the sliding sleeve 1, in particular the positioning section 2. The cam segment 6 has a through bore 8 which comprises a material accumulation 7. The material accumulation 7 is advantageously configured in the form of a longitudinal toothing system which extends in the axial direction along the longitudinal axis 5. The surface structure 3 of the positioning section 2 of the sliding sleeve 1 is advantageously configured in the form of a roll-formed portion which extends in the circumferential direction around the sliding sleeve 1. Accordingly, the geometrical configuration of the material accumulation 7 of the cam segment 6 is configured substantially transversely with respect to the geometrical configuration of the surface structure 3 of the positioning section 2 of the sliding sleeve 1. As a result, a reliable connection, in particular a press joint, is advantageously made possible between the cam segment 6 and the sliding sleeve 1 in the region of the positioning section 2.

Figure 3:
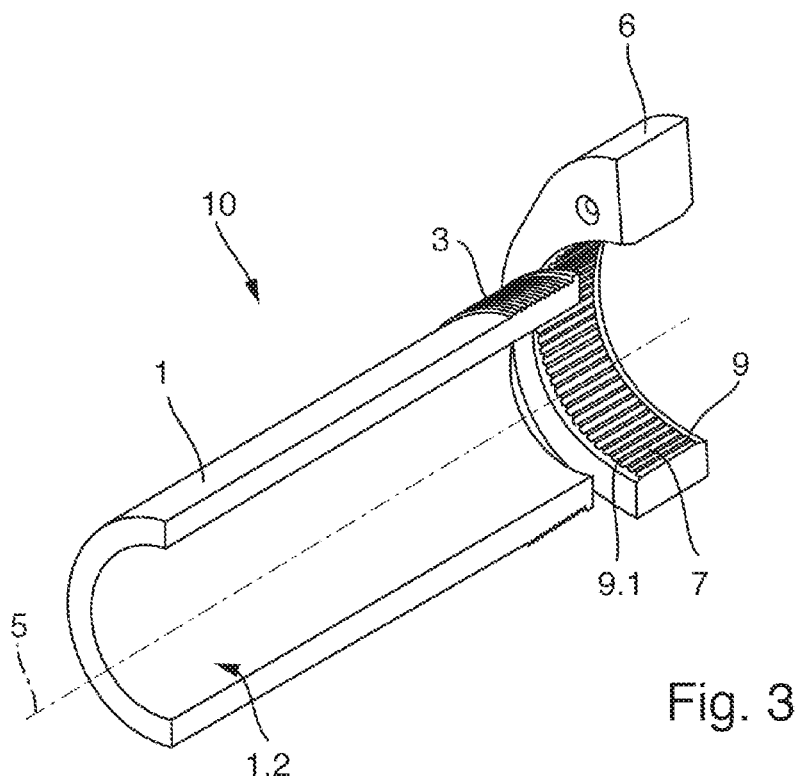
FIG. 3 is a perspective sectional view of that embodiment of a disassembled sliding module which is shown in FIG. 2.
Figure 4:
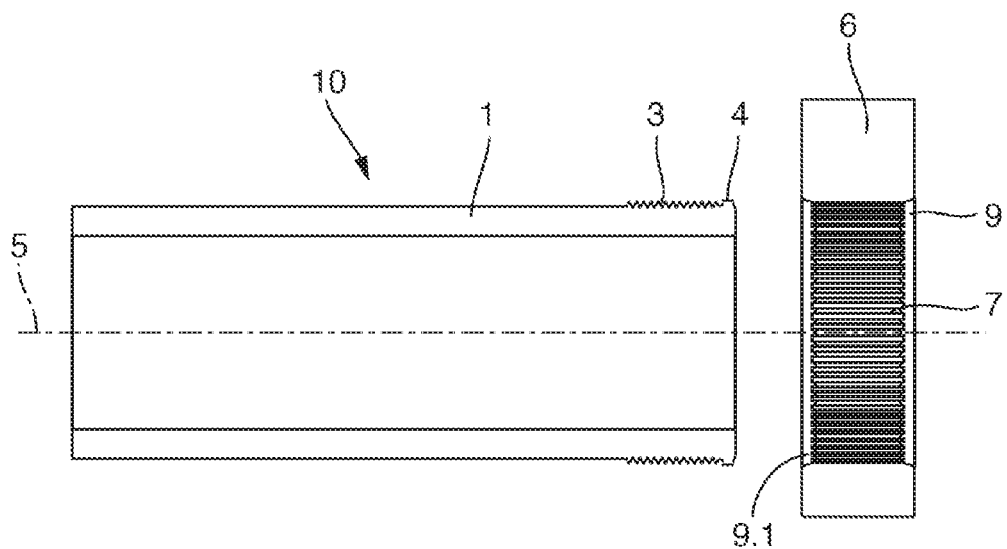
FIG. 4 is a lateral sectional view of that embodiment of a disassembled sliding module which is shown in FIG. 2 and FIG. 3.

FIG. 3 once again clearly shows the configuration of the material accumulation 7, in particular the longitudinal toothing system of the cam segment 6. The insertion bevel 9 of the cam segment 6 can also be seen in FIG. 3, which insertion bevel 9 advantageously serves to make mounting of the cam segment 6 on the sliding sleeve 1 possible in a simple way. It is also conceivable that the cam segment 6 has a further insertion bevel 9.1. The configuration of the surface structure 3 of the sliding sleeve 1 is clarified in FIG. 4 which shows the lateral sectional illustration of the disassembled sliding module which is shown in FIGS. 2 to 3. The surface structure 3 which is advantageously present in the form of a roll-formed portion makes it possible to increase the outer circumference of the sliding sleeve 1, in order, as a consequence, to make a sufficient press joint possible between the sliding sleeve 1 and the cam segment 6 during the application of the cam segment 6 on the positioning section 2 of the sliding sleeve 1.

Figure 5:
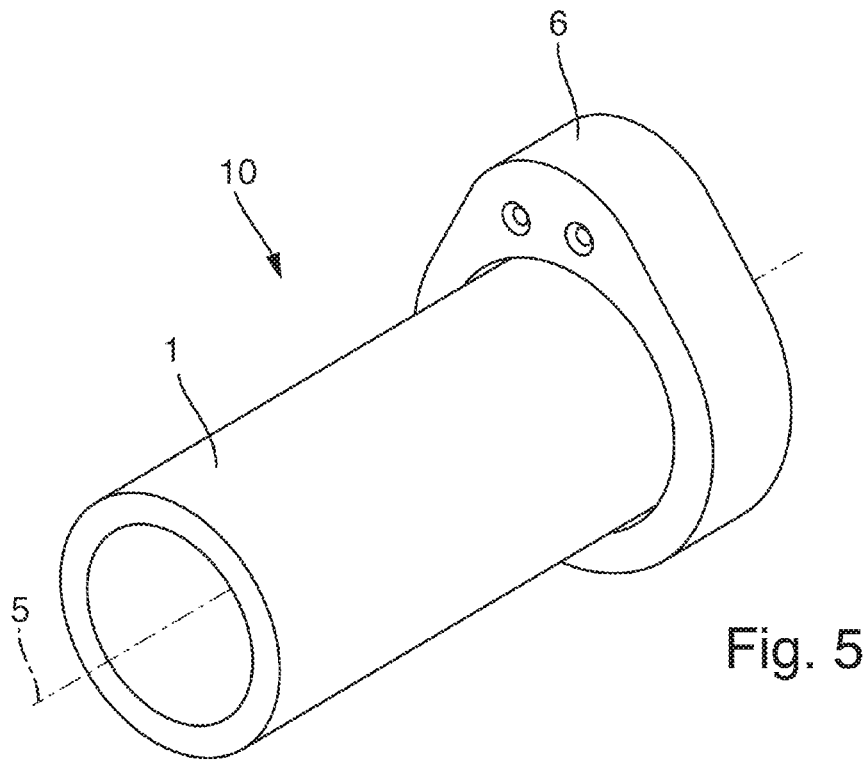
FIG. 5 is a perspective view of one embodiment of a sliding module in the mounted state.
Figure 6:
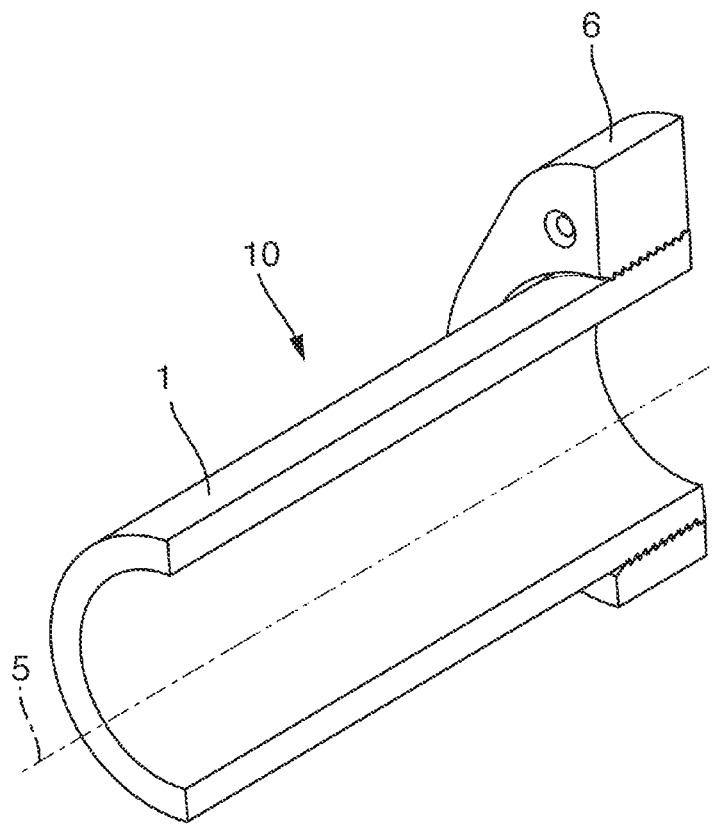
FIG. 6 is a perspective sectional view of that embodiment of a mounted sliding module which is shown in FIG. 5.
Figure 7:
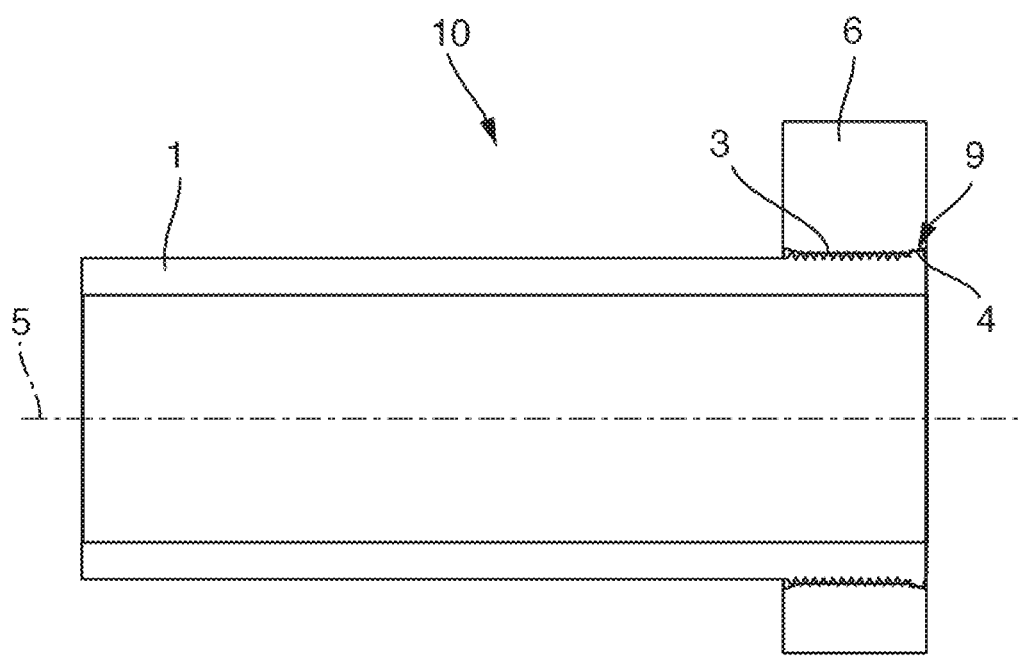
FIG. 7 is a lateral sectional view of that embodiment of a mounted sliding module which is shown in FIG. 5 and FIG. 6.

FIGS. 5 to 7 show different illustrations of one embodiment of a sliding module 10 according to the invention. It can be seen here that, during an application of the cam segment 6 on the sliding sleeve 1 along the mounting direction 20, a connection takes place between the material accumulation 7 of the cam segment 6 and the surface structure 3 of the positioning section 2 of the sliding sleeve 1 in the region of the positioning section 2. Here, as can be seen, in particular, in FIG. 7, the cam segment 6 is pushed onto the positioning section 2 to such an extent that the stop region 4 makes contact with the insertion bevel 9 and prevents a further displacement of the cam segment 6 in the axial direction along the longitudinal axis 5. The stop region 4, in particular the force absorbing surface of the stop region 4, advantageously makes contact with a surface of the insertion bevel 9 of the cam segment 6, as a result of which secondly the transfer to the stop region 4 of the positioning section 2 of the sliding sleeve 1 of the axial force which is applied to the cam segment 6 also takes place. As a result, an unwanted axial displacement of the cam segment 6 on the sliding sleeve 1 in the axial direction along the longitudinal axis 5 is advantageously prevented.

LIST OF DESIGNATIONS

1 Sliding sleeve
1.1 Outer circumferential face 1.2 Inner circumferential face
1.3 Through opening
2 Positioning section
3 Surface structure
4 Stop region
5 Longitudinal axis
6 Cam segment
6.1 Cam
7 Material accumulation
8 Through bore
9 Insertion bevel
9.1 Further insertion bevel
10 Sliding module
20 Mounting direction

What is claimed is:

1. A sliding module comprising:
a sliding sleeve; and
at least one cam segment having at least one cam;
wherein the sliding sleeve has a positioning section configured to position the cam segment fixedly against rotation and displacement, the positioning section comprising:
a surface structure on the outer circumferential face of the sliding sleeve configured to produce a press-fit connection between the cam segment and the sliding sleeve; and
a stop that limits axial movement of the cam segment, wherein the stop is a constituent part of the surface structure.

2. The sliding module of claim 1, wherein the surface structure is a material accumulation.

3. The sliding module of claim 2, wherein the surface structure is a roll-formed portion.

4. The sliding module of claim 1, wherein the stop is a projection which extends in the radial direction away from the outer circumferential face.

5. The sliding module of claim 1, wherein the stop protrudes beyond the surface structure in the radial direction.

6. The sliding module of claim 1, wherein the stop is configured at a distal end of the sliding sleeve.

7. The sliding module of claim 1, wherein the cam segment has a through bore with at least one insertion bevel which is disposed at a distal end thereof.

8. The sliding module of claim 1, wherein the cam segment has a through bore with a material accumulation.

9. The sliding module of claim 8, wherein the cam segment has a through bore with a toothing system.

10. A camshaft, comprising: a load-bearing shaft with at least one longitudinal toothing system which is configured in sections on the load-bearing shaft, and a sliding module comprising:
a sliding sleeve configured to slide longitudinally on the load-bearing shaft; and
at least one cam segment having at least one cam;
wherein the sliding sleeve has a positioning section configured to position the cam segment fixedly against rotation and displacement, the positioning section comprising:
a surface structure on the outer circumferential face of the sliding sleeve configured to produce a press-fit connection between the cam segment and the sliding sleeve; and
a stop that limits axial movement of the cam segment, wherein the stop is a constituent part of the surface structure.

* * * * *